(12) United States Patent
Kuze et al.

(10) Patent No.: US 8,736,792 B2
(45) Date of Patent: May 27, 2014

(54) VIEWING-ANGLE-ENHANCING FILM FOR LIQUID CRYSTAL DISPLAY DEVICE, PROTECTIVE FILM WITH VIEWING-ANGLE-ENHANCING-FUNCTION, AND LIQUID CRYSTAL DISPLAY DEVICE

(75) Inventors: Katsuaki Kuze, Ohtsu (JP); Kenji Kawai, Ohtsu (JP); Kazumoto Imai, Ohtsu (JP); Akihumi Yasui, Ohtsu (JP); Akira Matsuda, Ohtsu (JP); Masao Kochi, Tokyo (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 58 days.

(21) Appl. No.: 13/497,482

(22) PCT Filed: Oct. 13, 2010

(86) PCT No.: PCT/JP2010/067939
§ 371 (c)(1),
(2), (4) Date: Mar. 21, 2012

(87) PCT Pub. No.: WO2011/048987
PCT Pub. Date: Apr. 28, 2011

(65) Prior Publication Data
US 2012/0176573 A1 Jul. 12, 2012

(30) Foreign Application Priority Data

Oct. 22, 2009 (JP) ................................. 2009-242972

(51) Int. Cl.
*G02F 1/1335* (2006.01)
(52) U.S. Cl.
USPC .......................................... 349/112; 428/1.3

(58) Field of Classification Search
None
See application file for complete search history.

(56) References Cited

U.S. PATENT DOCUMENTS

2008/0068716 A1 3/2008 Goto
2011/0128628 A1* 6/2011 Kuze et al. .................... 359/599

FOREIGN PATENT DOCUMENTS

| EP | 1767962 A1 | 3/2007 |
| JP | 06-230223 A | 8/1994 |
| JP | 07-114013 A | 5/1995 |
| JP | 09-179113 A | 7/1997 |
| JP | 10-206836 A | 8/1998 |

(Continued)

OTHER PUBLICATIONS

Machine translation of JP 9-179113, published Jul. 1997.*

(Continued)

*Primary Examiner* — Mike Stahl
(74) *Attorney, Agent, or Firm* — Leydig, Voit & Mayer, Ltd.

(57) ABSTRACT

To provide a viewing-angle-enhancing film which is set in a liquid crystal display device at a position nearer to an observer than the position of a liquid crystal layer in the device, and which attains, at a high level, the compatibility of being enhanced in viewing angle with a decrease in the darkening of images at the time of observing the screen from the front thereof. A viewing-angle-enhancing film which is set in a liquid crystal display device at a position nearer to an observer than the position of a liquid crystal layer in the device, and simultaneously satisfies the following requirements (1) to (3): (1) the film has a parallel ray transmittance of 5 to 90%; (2) the film has a diffusivity (A) of 1 to 20 degrees in its main diffusion direction; and (3) the film has a diffusivity ratio of 0.25 to 15% in the main diffusion direction.

17 Claims, 1 Drawing Sheet

(56) References Cited

FOREIGN PATENT DOCUMENTS

| | | | |
|---|---|---|---|
| JP | 2000-056694 | A | 2/2000 |
| JP | 2002-221608 | A | 8/2002 |
| JP | 2004-341309 | A | 12/2004 |
| JP | 2007-10798 | A * | 1/2007 |
| JP | 2007-053019 | A | 3/2007 |
| JP | 2010-145976 | A | 7/2010 |
| WO | 2006/112325 | A | 10/2006 |
| WO | 2008/038754 | A1 | 4/2008 |
| WO | 2009/107634 | A | 9/2009 |

OTHER PUBLICATIONS

Japanese Patent Office, International Search Report for International Patent Application No. PCT/JP2010/067939 (Nov. 16, 2010), English translation.

International Bureau of WIPO, International Preliminary Report on Patentability in International Patent Application No. PCT/JP2010/067939 (May 24, 2012), English translation.

European Patent Office, Extended European Search Report in European Patent Application No. 10824836.0 (Feb. 3, 2014).

\* cited by examiner

VIEWING-ANGLE-ENHANCING FILM FOR LIQUID CRYSTAL DISPLAY DEVICE, PROTECTIVE FILM WITH VIEWING-ANGLE-ENHANCING-FUNCTION, AND LIQUID CRYSTAL DISPLAY DEVICE

TECHNICAL FIELD OF THE INVENTION

The present invention relates to a viewing-angle-enhancing film set in a liquid crystal display device at a position nearer to an observer than the position of a liquid crystal layer in the device, a protective film with viewing-angle-enhancing-function, and a liquid crystal display device. The present invention relates particularly to a viewing-angle-enhancing film satisfying, at a high level, antinomic phenomena of an enhancement in viewing angle and a decrease in the darkening of images at the time of observing the screen from the front thereof.

BACKGROUND ART

Liquid crystal display devices make good use of their characteristics, such as lightness, thinness, and lowness in consumption power to be very frequently used as flat panel displays. The use thereof has been spreading year after year for portable telephones, personal digital assistance (PDA), personal computers, televisions, and others.

However, liquid crystal display devices have a problem that their viewing angle is narrower than that of CRTs. Against this problem, Patent Document 1 suggests that a light diffusing film having a function of causing incident light to scatter/penetrate in/through the film is laid on a liquid crystal display screen. This film is yielded by melt-extruding, into a sheet form, a composition having an island-in-sea structure made of transparent resins different from each other in refractive index, and further drawing the sheet. Intensity distributions of scattering/penetrating light in the film, which are shown in FIGS. 3 and 4 of Patent Document 1, respectively, suggest that in each of these cases, an enhancement of the film in viewing angle and a decrease in the darkening are not compatible with each other.

Patent Document 2 suggests an anisotropic scattering spectroscopic film which has a distribution of a scattering angle varied in accordance with wavelength, and further has scattered light distributions different along two directions having different azimuth angles to the film plane by 90 degrees. This film produces a very good effect for an enhancement in viewing angle in the same way as in Patent Document 1. However, a scattered light distribution of a film that is shown in FIG. 3(b) of Patent Document 2 suggests that a decrease in the darkening is still insufficient.

Furthermore, Patent Document 3 suggests a transmitted-light-scattering controlling film which is made of a single thermoplastic resin, and has a region containing many microscopic pores inside of the film. This film makes use of light-scattering based on a matter that polycarbonate is melted into the form of a film and the film is drawn so that cracks in the form of trenches are generated. However, from the angle-dependency of the light scattering intensity of the film in FIG. 13 of Patent Document 3, it is suggested that the film is insufficient in diffusivity and the darkening is satisfactorily decreased, but the effect of enhancing the viewing angle is insufficient.

Furthermore, Patent Document 4 suggests a light scattering sheet yielded by mixing polymethyl methacrylate PMMA with styrene/acrylonitrile copolymer SAN with each other, melting the mixture, casting the melted mixture, and drying the mixture. This film has a phase-separated structure composed of plural resins different from each other in refractive index, and further has a co-continuous phase structure formed by spinodal decomposition. However, from the angle-dependency of the light scattering intensity of the film in FIG. 4 of Patent Document 4, it is suggested that the film is large in diffusivity so that the effect of decreasing the darkening is insufficient. As described in Patent Document 4 also, the effect of this film is only an effect of uniformalizing brightness which depends on a change in the viewing angle.

Additionally, disclosed are many techniques using a lens film. About, for example, a technique disclosed in Patent Document 5, from diffusivity distributions of transmitted light of a film in FIGS. 8 and 9, the same matter as in Patent Document 1 is suggested. In other words, in the direction in FIG. 8, the film is high in diffusivity so that the film is excellent in viewing-angle-enhancing effect although the darkening is poorly decreased while in the direction in FIG. 9, the film is low in diffusivity so that the darkening is satisfactorily decreased although the film is poor in viewing-angle-enhancing effect.

As described above, light diffusing films of liquid crystal display devices in the prior art satisfy either an enhancement in viewing angle, or a decrease in the darkening. However, under the present circumstances, a film which attains the two properties at a high level has not been created yet.

The display screen of liquid crystal display devices has a problem of being easily stained, or scratched (or injured). Thus, disclosed is a protective film, for a liquid crystal display device, which prevents the display screen of the device from being broken, stained, scratched, or damaged (for example, Patent Document 6).

Disclosed is also a protective film having the so-called peep preventing function, which is a film set to the front surface of a liquid crystal display device to control the visible range of its display screen in such a manner that an image thereon cannot be viewed diagonally from the front of the screen although the image can be viewed from substantially the front (for example, Patent Document 7).

As described above, liquid crystal display devices have a problem that their viewing angle is narrower than that of CRTs. For example, a car navigation system is set up in a direction diagonal to a driver in many cases. Thus, the viewing angle thereof is desired to be enhanced. For example, as functions for display information of a portable telephone are made into a higher level, or some other progress is further made, a use manner such that its display screen is viewed by many persons is increasing. Thus, an enhancement in the viewing angle (of the screen), which is reverse to the peep-preventing function, is being intensely required. In light of such a background, a protective film, for a liquid crystal display device, to which a viewing-angle-enhancing function is added is intensely desired.

PRIOR ART DOCUMENTS

Patent Documents

Patent Document 1: Japanese Patent Application Laid-Open (JP-A) No. 114013/95
Patent Document 2: Japanese Patent Application Laid-Open (JP-A) No. 2004-341309
Patent Document 3: Japanese Patent Application Laid-Open (JP-A) No. 206836/98
Patent Document 4: Japanese Patent Application Laid-Open (JP-A) No. 2002-221608

Patent Document 5: Japanese Patent Application Laid-Open (JP-A) No. 179113/97

Patent Document 6: Japanese Patent Application Laid-Open (JP-A) No. 2000-56694

Patent Document 7: Japanese Patent Application Laid-Open (JP-A) No. 2010-145976

DISCLOSURE OF THE INVENTION

Problem that the Invention is to Solve

In light of such an actual situation in the prior art, the present invention has been made. An object thereof is to provide a viewing-angle-enhancing film which is set in a liquid crystal display device at a position nearer to an observer than the position of a liquid crystal layer in the device, and which attains, at a high level, the compatibility of being enhanced in viewing angle with a decrease in the darkening of images at the time of observing the screen from the front thereof; and a protective film with viewing-angle-enhancing-function which can be removably attached to the display screen surface of a liquid crystal display device, and which makes an improvement in a narrowness in the viewing angle of the liquid crystal display device, which is a drawback thereof, and further has a function of protecting the display screen of the liquid crystal display device.

Means for Solving the Problem

In order to attain this object, the inventors have eager investigations to find out that the viewing angle enhancement and the darkening decrease, which are antinomic phenomena, can be attained at a high level by controlling the parallel ray transmittance, the diffusivity (A) and the diffusivity ratio of a viewing-angle-enhancing film into specific ranges, respectively. Thus, the present invention has been made.

Accordingly, the present invention includes the following invention-aspects (i) to (xii):

(i) A viewing-angle-enhancing film which is set in a liquid crystal display device at a position nearer to an observer than the position of a liquid crystal layer in the device, and simultaneously satisfies the following requirements (1) to (3):

(1) the film has a parallel ray transmittance of 5 to 90%;
(2) the film has a diffusivity (A) of 1 to 20 degrees in its main diffusion direction; and
(3) the film has a diffusivity ratio of 0.25 to 15% in the main diffusion direction.

(ii) The viewing-angle-enhancing film according to (i), wherein the film has a diffusivity (B) of 140 to 175 degrees in the main diffusion direction.

(iii) The viewing-angle-enhancing film according to (i) or (ii), wherein the ratio of the diffusivity (B) in the main diffusion direction to the diffusivity (B') of the film in the direction perpendicular to the main diffusion direction (the diffusivity (B)/the diffusivity (B')) is from 1.2 to 6.0.

(iv) The viewing-angle-enhancing film according to any one of (i) to (iii), which is yielded by melt-extruding a mixture of at least two kinds of thermoplastic resins incompatible with each other.

(v) The viewing-angle-enhancing film according to any one of (i) to (iii), which consists of a polyester type crazed film.

(vi) The viewing-angle-enhancing film according to any one of (i) to (iii), which consists of a lens film having a substantially flat valley region between lens regions adjacent to each other.

(vii) The viewing-angle-enhancing film according to any one of (i) to (vi), wherein at least one functional layer selected from a hard coat layer, an antireflection layer, and an antiglare layer is stacked over a surface of the viewing-angle-enhancing film that is to face an observer.

(viii) A protective film with viewing-angle-enhancing-function, wherein the viewing-angle-enhancing film recited in any one of (i) to (vii), and a self-adhesive layer are stacked over each other.

(ix) A protective film with viewing-angle-enhancing-function, wherein the viewing-angle-enhancing film recited in any one of (i) to (vi) is stacked on a double-sided adhesive film, one of the double sides consisting of a self-adhesive layer, and the other consisting of a pressure-sensitive adhesive layer, through the pressure-sensitive adhesive layer.

(x) The protective film with viewing-angle-enhancing-function according to (viii) or (ix), wherein the self-adhesive layer is made of a soft polymer.

(xi) A liquid crystal display device, including a liquid crystal layer, and the viewing-angle-enhancing film recited in any one of (i) to (vii), wherein the film is set at a position nearer to an observer than the position of the liquid crystal layer.

(xii) A liquid crystal display device, including a display screen, and the protective film with viewing-angle-enhancing-function recited in any one of (viii) to (x), wherein the film is removably bonded through the self-adhesive layer to a surface of the display screen.

Advantages of the Invention

The viewing-angle-enhancing film of the present invention has a light distributing pattern having both properties of light straight-transmitting property and light diffusive-transmitting property. Thus, the present invention can provide a liquid crystal display device satisfying, at a high level, antinomic phenomena of an enhancement in viewing angle, and a decrease in the darkening of its images at the time of observing the screen from the front thereof.

Moreover, in the protective film with viewing-angle-enhancing-function of the present invention, the self-adhesive layer is staked, so that the protective film with viewing-angle-enhancing-function can simply and easily be fixed, through this self-adhesive layer, onto the display screen surface of a liquid crystal display device without nipping the air in an interface between the self-adhesive layer and the display screen. Additionally, since the viewing-angle-enhancing function is added to the protective film, viewing angle of the fixed liquid crystal display device can be enhanced. Moreover, when the front surface of the protective film with viewing-angle-enhancing-function is, for example, stained or scratched, the film can easily be detached. Furthermore, the above-mentioned fixing is attained through the self-adhesive layer; therefore, in the case of the detachment, this detachment can be attained without generating stains on the display screen, which are caused by, for example, the shift of the adhesive layer onto the display screen when fixing through the pressure-sensitive adhesive layer. Furthermore, since the self-adhesive layer may be made of the soft polymer, the display screen can be restrained from being broken by relieving-effect based on the deformation of the self-adhesive layer even when external force is applied to the display screen.

BRIEF DESCRIPTIONS OF DRAWINGS

BEST MODE FOR CARRYING OUT THE INVENTION

Characteristics of the Viewing-Angle-Enhancing Film

Figure 1:
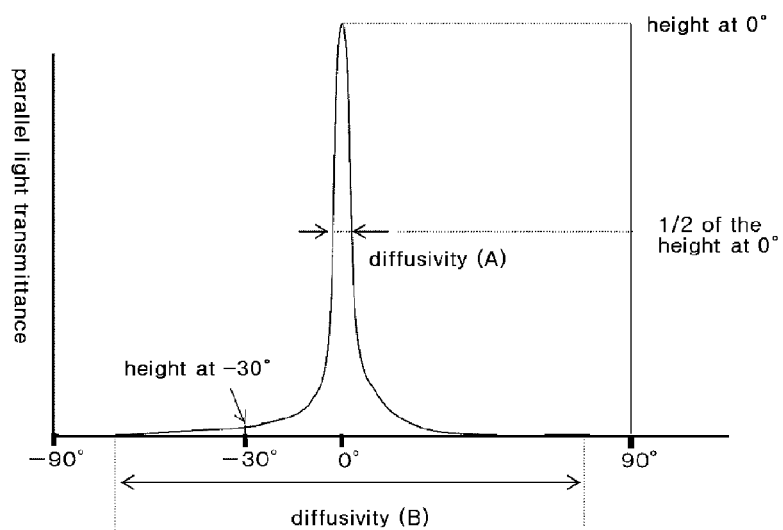
FIG. 1 is a chart showing an example of a preferred light distributing pattern of a viewing-angle-enhancing film of the present invention.

The viewing-angle-enhancing film of the present invention is set in a liquid crystal display device at a position nearer to an observer than the position of a liquid crystal layer in the device, and simultaneously satisfies the following requirements (1) to (3):

(1) the film has a parallel ray transmittance of 5 to 90%;

(2) the film has a diffusivity (A) of 1 to 20 degrees in its main diffusion direction; and (3) the film has a diffusivity ratio of 0.25 to 15% in the main diffusion direction.

The parallel ray transmittance is preferably from 8 to 90%, more preferably from 10 to 90%, furthermore preferably from 20 to 70%, and most preferably from 40 to 70%. The parallel ray transmittance is an index of light straight-transmitting property. In the present invention, the transmittance is obtained by a method described in working examples that will be described later. Specifically, the parallel ray transmittance (of a film) is represented by the average value of measured values that are obtained by fixing this film onto a sample stand of a haze meter to set the winding-direction of the film along a vertical direction and a horizontal direction, respectively, and then making measurements. The reason why the measurements are made to set the winding-direction of the film along the vertical direction and the horizontal direction, respectively, is that the film may be largely changed in optical property between the two directions. If the parallel ray transmittance is less than the above-mentioned lower limit, the darkening-decreasing effect unfavorably declines. Contrarily, if the parallel ray transmittance is more than the upper limit, the viewing-angle-enhancing effect unfavorably declines.

The diffusivity (A) in the main diffusion direction is preferably from 1 to 15 degrees, more preferably from 1 to 10 degrees, and most preferably from 1 to 6 degrees. The diffusivity (A) is an index of diffusivity that is in general widely adopted. In the present invention, the diffusivity is obtained by a method described in working examples that will be described later. It is technically difficult to make the diffusivity (A) lower than the lower limit. On the other hand, if the diffusivity (A) is made more than the upper limit, the darkening-decreasing effect unfavorably deteriorates.

The above-mentioned diffusivity ratio in the main diffusion direction is preferably from 0.30 to 12%, more preferably from 0.40 to 10%, and most preferably from 1.0 to 10% from the viewpoint of an enhancement in the viewing angle. The diffusivity ratio is an index for balancing the viewing angle enhancement and the darkening decrease, which are antinomic phenomena, with each other. In the present invention, the diffusivity ratio is obtained by a method described in working examples that will be described later. If the diffusivity ratio is less than the above-mentioned lower limit, the viewing-angle-enhancing effect unfavorably declines. If the diffusivity ratio is more than the upper limit, the darkening-decreasing effect unfavorably declines.

The viewing-angle-enhancing film of the present invention has a diffusivity (B) of preferably 140 to 175 degrees, more preferably 150 to 175 degrees, and most preferably 155 to 175 degrees in the main diffusion direction. The diffusivity (B) is a diffusivity-indicating index that is not generally used. The index is an index that has been created by a matter that the inventors have found out that this index becomes an index for the viewing-angle-enhancing effect. In the present invention, the diffusivity (B) is obtained by a method described in working examples that will be described later. If the diffusivity (B) is less than the above-mentioned lower limit, the viewing-angle-enhancing effect is insufficient. Contrarily, if the diffusivity (B) is more than the upper limit, the darkening-decreasing effect unfavorably declines.

In the viewing-angle-enhancing film of the present invention, the ratio of the diffusivity (B) in the main diffusion direction to the diffusivity (B') of the film in the direction perpendicular to the main diffusion direction (the diffusivity (B)/the diffusivity (B')), which may be referred to as the anisotropy, is preferably from 1.2 to 6.0 and more preferably from 1.3 to 6.0. If the ratio is less than the lower limit, the effect of investing the anisotropy unfavorably declines. On the other hand, it is technically difficult that the ratio is made more than the upper limit.

An object of the viewing-angle-enhancing film of the present invention is to make the viewing angle enhancement and the darkening decrease, which are antinomic phenomena, compatible with each other with a good balance at a high level. In order to attain the viewing angle enhancement, the film is required to have a high diffusivity. However, for the darkening decrease, the film is required to have a high light straight-transmitting property. These properties generally show antinomic behaviors. In order to balance the antinomic phenomena with each other, it is preferred to satisfy the above-mentioned characteristics.

It has been hitherto known that a high diffusivity is necessary for the viewing angle enhancement. In the present invention, however, it is concluded that the diffusivity (A), which is an index of diffusivity that is in general widely adopted, should be preferably set to a low range rather than a high range, and further the low range should be a specified range, as described above, which is different from any conventional finding. This is a surprising matter. In short, in order to make a high diffusivity and a high light straight-transmitting property, which are necessary for the investment of the above-mentioned properties, compatible with each other, it is necessary to take measurements contrary to the conventional finding.

Only by setting the parallel ray transmittance and the diffusivity (A) into the above-mentioned ranges, the film is low in diffusion-transmitting property so that the film is insufficient in viewing angle enhancement although the film produces an effective darkening-decreasing effect. Thus, the film cannot satisfy the above-mentioned properties. In order to make the antinomic phenomena of the viewing angle enhancement and the darkening decrease compatible with each other, it is necessary that the film satisfies the characteristic that the diffusivity ratio in the main diffusion direction is set into the above-mentioned range, as well as the first and the second of the characteristics. The diffusivity ratio in the main diffusion direction is an index of the spread of the skirt or foot of a light distribution pattern in the main diffusion direction. Thus, the diffusivity ratio may also be regarded as a sort of index representing the scale or magnitude of the diffusivity. When the diffusivity ratio is set into the above-mentioned range, the antinomic phenomena of the viewing angle enhancement and the darkening decrease can be unprecedentedly made compatible with each other. About the techniques disclosed in the above-mentioned Patent documents, the light distribution patterns described therein demonstrate that the above-mentioned characteristics are not satisfied in any direction. When the diffusivity (B) in the main diffusion direction is further set into the above-mentioned range, the compatibility of the antinomic phenomena with each other can be made stable.

FIG. 1 shows shown an example of a preferred light distribution pattern for satisfying the above-mentioned optical characteristics.

When an anisotropy is invested to the film, the film can be made high in light diffusivity in a specific direction. However, even when the anisotropy is invested, for example, a difference in the parallel ray transmittance, which is an index of light straight-transmitting property, or some other property is smaller between directions of the film than a difference in diffusivity. Accordingly, light can be condensed in a specific direction. Thus, the antinomic phenomena of the viewing angle enhancement and the darkening decrease can be balanced with each other at a high level.

The viewing-angle-enhancing film used in the present invention has an anisotropic degree of preferably 1.1 or more, more preferably 2.0 or more, and most preferably 3.0 or more, the anisotropic degree being measured by a method that will be described in working examples. If the anisotropy is less than the lower limit, the anisotropy-investing effect unfavorably declines. The upper limit thereof is not particularly limited; the anisotropic degree is preferably set to 6.0 or less from the viewpoint of the darkening.

Many patent documents disclose that it is effective for an enhancement in the viewing angle to invest an anisotropy to the film. About a diffusivity for evaluating the anisotropy, use is made of not the diffusivity (A), which is an index of diffusivity that is in general widely adopted, but the diffusivity (B), which is an index of the diffusivity that has newly been found out by the inventors. Determination by use of the diffusivity (B) unprecedentedly produces an effective result. In the case of the above-mentioned preferred light distribution pattern, the film may not have a difference in the diffusivity (A) between directions even when an anisotropy is given thereto.

The method by which the film attains this light distribution pattern is not particularly limited. It is preferred to orient, into a specific direction, a film-constituting element for regulating diffusion-control for investing diffusivity (for example, the element being the shape of islands in a case where the film has an island-in-sea structure that will be described below; or being the shape of crazes in a case where the film is a crazed film) slenderly and lengthily. In the case of, for example, a film that will be described below, and that is yielded by melt-extruding a mixture of at least two kinds of thermoplastic resins incompatible with each other and has an island-in-sea structure, it is preferred to orient units of the island constituents in a specific direction as slenderly and lengthily as possible.

(A Process for Producing the Viewing-Angle-Enhancing Film Consisting of a Mixture of Two Kinds of Thermoplastic Resins Incompatible with Each Other)

The following will describe a process for producing the viewing-angle-enhancing film of the present invention. It is preferred to yield the viewing-angle-enhancing film of the present invention by melt-extruding a mixture of at least two kinds of thermoplastic resins incompatible with each other. The form that the two or more kinds of thermoplastic resins incompatible with each other are present may be the so-called island-in-sea structure, wherein the resins are independently present in a continuous phase and dispersed phases, respectively, or a structure wherein the two resins are formed into a co-continuous phase. The characteristics can be controlled by the refraction or scattering of light on the interface between the two resins.

Since the melt extrusion is adopted in the present invention, the process is economically advantageous. Moreover, in the melt extrusion, no solvent is used, the situation of which is different from that of coating; thus, the process is environment-friendly. Furthermore, according to the melt extrusion, it is unnecessary to incorporate non-meltable fine particles for the investment of light scattering property; thus, in the step of forming the film, a decrease can be made in the clogging of the filtrating filter with the melted resins. Thus, the process is very good in productivity and further the resultant film is also high in clearness.

The method of forming the film in the melt extrusion is not particularly limited, and may be, for example, either a T-die method or an inflation method. The formed film may be a film of being not drawn, or may be drawn. The viewing-angle-enhancing film of the present invention may be made into a single layer, or into a multilayered structure of two or more layers. As far as at least one layer of the multilayered structure is a layer that consists of a viewing-angle-enhancing film having the above-mentioned structure, the other layer(s) may (each) be merely a transparent layer that does not have the above-mentioned characteristics. All layers thereof may each be made into the viewing-angle-enhancing layer structure. The multilayered structure may be produced by multilayer co-extrusion, extruding-lamination, or dry lamination. The thickness of the viewing-angle-enhancing film of the present invention is not particularly limited, and is preferably from 10 to 500 μm, more preferably from 20 to 500 μm, and most preferably from 20 to 200 μm.

(Resins Incompatible with Each Other)

Examples of each of the thermoplastic resins to be used include polyolefin type resins such as polyethylene type resin, polypropylene type resin, polybutene type resin, cyclic polyolefin type resin and polymethylpentene type resin, polyester type resins, acrylic resins, polystyrene type resins, and polycarbonate type resins; and copolymers thereof.

At least two kinds of resins incompatible with each other (insoluble in each other) may be selected from these thermoplastic resins. The ratio of one of the two or more kinds of incompatible thermoplastic resins to the other(s) is preferably from 10/90 to 90/10, more preferably from 20/80 to 80/20, and most preferably from 30/70 to 70/30. The two or more kinds of thermoplastic incompatible resins may be blended with each other in the film-forming step. Alternatively, the resins that are beforehand blended with each other by a kneading method or some other may be used.

In the present invention, three or more kinds of thermoplastic resins may be blended with each other. It is allowable to use additives, such as a compatibility accelerator and a dispersion diameter adjustor, together to improve the affinity of the resins with each other. It is also allowable to incorporate stabilizers, such as an antioxidant and an ultraviolet absorbent, an antistatic agent, and other additives. As far as the above-mentioned optical properties are not damaged, fine particles, such as inorganic particles or polymer beads, may be added.

The melt flow rates of the two or more kinds of incompatible thermoplastic resins are not particularly limited as far as the rates permit the optical characteristics to be satisfied. The melt flow rate of each of the thermoplastic resins is appropriately selected from melt flow rates ranging from 0.1 to 100 and preferably from 0.2 to 50, measured at 230° C.

At least one of the two or more kinds of thermoplastic resins is preferably polyolefin type resin. An example thereof is any combination of a polyolefin type resin with a polyester resin type rein, polycarbonate type resin or acrylic resin, or any mixture thereof. In the case of this exemplified composition, it is preferred that the polyolefin type resin is a modified polyolefin type resin into which polar groups such as carboxyl, hydroxyl or ester groups are introduced. The use of such a thermoplastic resin composition makes the investment of the above-mentioned preferred light distribution pattern easy.

It is also preferred to use polyolefin type resins for the two thermoplastic resins from the viewpoint of light resistance and economy. In this case, the following is preferred for an easy investment of the above-mentioned preferred light distribution pattern: a combination of a cyclic polyolefin type resin with a polyethylene type resin, or a combination of a polypropylene type resin with a polyolefin resin containing ethylene and/or butene. Furthermore, this combination is preferred also from the viewpoint of light resistance and economy. This combination may be combined with a nanocrystal-structure controlled polyolefin type elastomer resin.

Examples of the cyclic polyolefin resin include resins each having a cyclic polyolefin structure made from norbornene or tetracyclododecene. Examples thereof include (1) a resin yielded by subjecting a ring-opened (co)polymer made from a norbornene based monomer optionally to polymer modification, such as the addition of maleic acid or the addition of cyclopentadiene, and then hydrogenating the resultant polymer; (2) a resin yielded by subjecting a norbornene based monomer to addition polymerization, and (3) a resin yielded by subjecting a norbornene based monomer, and an olefin type monomer such as ethylene or $\alpha$-olefin to addition copolymerization. The method for the polymerization and that for the hydrogenation may be ordinary methods.

These resins may have high glass transition temperature. It appears that, by using such resins, the island constituents made slender by shears or a draft in the die are rapidly solidified when the resins are cooled, so that stable properties are easily exhibited.

The glass transition temperature is preferably 100° C. or higher, more preferably 110° C. or higher, and most preferably 120° C. or higher. The upper limit thereof is naturally decided in accordance with the monomer species (the Tg based on the cyclic monomer the proportion of which is 100%); the upper limit is preferably 230° C. or less, more preferably 200° C. or less, and most preferably 190° C. or less. If the temperature is higher than the upper limit, high temperature is required for the melt extrusion so that the resultant may be colored or an insoluble substance may be generated. The value of the glass transition temperature is a value measured in accordance with ISO 11357-1, -2, and -3 at a temperature-raising rate of 10° C./min.

The content by percentage of the cyclic component (s) in the cyclic polyolefin type resin is preferably from 70 to 90% by mass, and more preferably from 73 to 85% by mass. This range is preferred, in particular, in the case of a norbornene based resin. Particularly preferred is a cyclic polyolefin type resin with which ethylene is copolymerized in order to attain a desired property since the resin is high in affinity with any polyethylene type resin. The content by percentage of ethylene therein is preferably from 30 to 10% by mass, and more preferably from 27 to 15% by mass.

The polyethylene type resin may be a homopolymer, or a copolymer. In the case of the copolymer, the ethylene component is preferably in a proportion of 50% or more by mole. The density of the polyethylene resin, the polymerization method, and others are not particularly limited. The use of a copolymer having a density of 0.909 or less is preferred. The copolymer is, for example, a copolymer made from octene and ethylene. The polymerization method may be either a metallocene-catalyst method, or a non-metallocene-catalyst method.

The polypropylene type resin may be a homopolymer, or a copolymer. In the case of the copolymer, the propylene component is preferably in a proportion of 50% or more by mole. The method for producing the resin, the molecular weight, and others are not particularly limited. From the viewpoint of heat resistance and others, a resin high in crystallinity is preferred. Specifically, the crystallinity is determined by a melting heat measured with a differential scanning calorimeter (DSC). A resin having a melting heat of 65 J/g or more is preferred.

Examples of the polyolefin type resin containing ethylene and/or butene include homo-polyethylene resin, homo-polybutene resin, any copolymer of each of these resins with any other olefin type monomer, and any copolymer of each of these resins with acrylic acid or methacrylic acid, or an ester derivative thereof. The copolymer with the other olefin type monomer may be a random, block or graft copolymer. The polyolefin type resin may be a dispersed product, such as EP rubber. The method for producing the resin, the molecular weight, and others are not particularly limited. It is preferred to use, for example, the above-mentioned polyethylene type resin, or a copolymer made from ethylene and butene.

The nanocrystal-structure controlled polyolefin type elastomer resin is a thermoplastic polyolefin type elastomer wherein crystal/amorphous structures of a polymer are controlled in a nano-order, and the crystal has a nano-order network structure. An example thereof is a product NOTIO (registered trade name) manufactured by Mitsui Chemicals, Inc. While conventional polyolefin type elastomer resins have a crystal size in a micro-order, the nanocrystal-structure controlled polyolefin type elastomer resin has a feature that the crystal size thereof is controlled in a nano-order. Thus, this structure-controlled elastomer resin is better in transparency, heat resistance, softness, rubber elasticity, and others than conventional polyolefin type elastomer resins in many cases. Accordingly, the blend of the nanocrystal-structure controlled polyolefin type elastomer resin may make an improvement in the external appearance of the resultant film.

In the combination of a cyclic polyolefin type resin with a polyethylene type resin or polypropylene type resin, it is preferred to render the polyethylene type resin or polypropylene type resin a sea phase, and further make the polyethylene type resin or polypropylene type resin of the sea phase higher in melt flow rate than the cyclic polyolefin type resin of the island phase.

In the combination of a cyclic polyolefin type resin with a polyethylene type resin or polypropylene type resin, the cyclic polyolefin type resin is incorporated in a proportion of preferably 10 to 60% by mass and more preferably 10 to 50% by mass of the whole of the resins. This range is preferred for embodiments that will be described below wherein the polyethylene type resin or polypropylene type resin is a sea phase. In a case having a structure contrary to this structure, wherein the cyclic polyolefin type resin is a sea phase, a viewing-angle-enhancing film having desired optical characteristics, in particular, a high anisotropic degree is not easily obtained due to the shears in the dice, and the flexibility or fluidity of the sea phase.

In the case of performing the method of melt-extruding the mixture of the two or more kinds of incompatible thermoplastic resins, for example, in a sea/island manner, it is preferred for the investment of the optical characteristics to give an anisotropy to the shape of the island constituents, as described above. The shape of the island constituents is preferably a slender string shape. The ratio of the length of the island constituents to the width of the island constituents is preferably 5 times or more, and more preferably 8 times or more. The formation of the slender string shape makes it possible to restrain the light straight-transmitting property from being lowered, and enhance the diffusion-transmitting property in the direction perpendicular to the island constituent-oriented direction.

In order to form an island structure in such a form, it is preferred to make a difference between the melt viscosity of the sea constituent resin and that of the island constituent resin. It is particularly preferred to make the island constituents lower in melt viscosity than the sea constituent. It is preferred therefor, for example, to make a difference in melt flow rate therebetween, and it is preferred to make the island constituents higher in melt flow rate than the sea constituent. It is also preferred to make a difference in rigidity between the sea constituent resin and the island constituent resin. It is particularly preferred to make the island constituents lower in rigidity than the sea constituent.

(Film-Forming Method)

The film-forming method according to the melt extrusion is not particularly limited, and is, for example, either a T-die method or an inflation method. The formed film may be a film of being not drawn, or may be dawn.

In the melt extrusion, generally, a film is formed by extruding a resin melted in an extruder from a die into a sheet form, and causing the sheet to adhere closely to a cooling roll, thereby cooling and solidifying the sheet. The close adhesion onto the cooling roll may be attained by pushing and fixing the sheet through a pressing roll that is in general widely used. For the investment of an anisotropy, however, it is preferred that at the time of the close adhesion onto the cooling roll, a liquid-pooled zone, which may be called a bank, is not made in the vicinity of an inlet in a region for the close adhesion. The liquid-pooled zone is generated when the sheet is pushed under pressure at the time of the close adhesion onto the cooling roll, that is, at the time when the sheet is pushed by a strong pressure; thus, it is preferred to make, at the close adhesion time, the pushing press for the close adhesion low. It is preferred to avoid a manner of pressuring the sheet with a pushing roll, which is in general widely used, to cause the sheet to adhere closely to the cooling roll.

The method is not limited as far as the method is a method of attaining the close adhesion with a weak pressure. The method is preferably, for example, a method of extruding a resin melted in an extruder from a die into a sheet form, causing the sheet to adhere closely to the roll in a pushing manner using a gas pressure, and/or a sucking manner, and/or an electrostatic close adhesion manner, and then cooling/solidifying the sheet to form the film. This method makes it possible to give a viewing-angle-enhancing film having an anisotropy stably.

The process for the close adhesion and the cooling/solidification by the gas-pressure-used pushing manner, and/or the sucking manner, and/or the electrostatic close adhesion manner is not limited. For example, the gas-pressure-used pushing manner may be the so-called air knife manner, wherein the sheet is pushed and fixed by a pressure of the air or some other, a vacuum chamber manner, wherein the sheet is sucked, for the close adhesion, through a pressure-reducing nozzle, or an electrostatic close-adhesion manner, wherein the close adhesion is attained by electrostatic force. These manners may be used alone or in combination. The latter combination form is preferred since the thickness precision of the resultant film can be enhanced.

The viewing-angle-enhancing film of the present invention may be produced by either a non-drawing method or a drawing method. When a polyester type resin is used for its light diffusion layer, it is preferred to draw the workpiece of the film monoaxially. The draw ratio thereof is preferably 2 times or more. The upper limit is not limited; the draw ratio is preferably less than 10 times. In this manner, the island phases are drawn in the drawing direction to come to have a slender structure. Thus, the film is remarkably improved in light diffusivity in the direction perpendicular to the island-phase-oriented direction, and can gain an anisotropy and a high diffusivity.

When the film is produced by a non-drawing method, the film may be produced by a method of stretching a melt-extruded sheet before the sheet is cooled and solidified, that is, a method of making the draft ratio high.

About the mixture of the two or more kinds of incompatible thermoplastic resins, the individual thermoplastic resins may be blended in an extruder or some other in the film-producing step, or the resins may be used in the form of a mixture prepared beforehand by a kneading method, or some other method.

For the investment of the optical characteristics, it is preferred to take a measurement for orienting the incompatible resins in a specific direction by a means for applying an intense shear to the resins inside the extruder, a means for applying an intense draft to the resins when the resins are extruded, or a means for drawing the resins into a single direction, or some other means.

(Crazed Film)

The viewing-angle-enhancing film of the present invention may consist of a crazed film. The crazed film is a film inside which voids or fibrils (hereinafter referred to as crazes) each having a submicron size are innumerably generated, and is a film produced by generating crazes by concentrating and releasing stress generated by film-bending. Hitherto, crazed films have been used for the purpose of a restraint of the viewing angle, which is contrary to that of the present invention (for example, "Industrial Materials", Vo. 148, No. 4, pp. 104-108 written by Hitoshi Miwa). The inventors have surprisingly found out that crazed films have an advantageous effect contrary to that known in the prior art.

The raw material of the crazed film is preferably polyester type resin. Since polyester type resin is high in transparency, the film can gain light straight-transmitting property.

About the size of the crazes, the width and the length are preferably from 0.1 to 0.7 μm, and from 2 to 10 μm, respectively, when they are measured by observing, with a confocal microscopy, a cross section obtained by cutting the crazed film in the direction parallel to the orientation direction of the crazes. If the width and the length of the crazes are less than the respective lower limits, the viewing-angle-enhancing effect decreases. Contrarily, if they are more than the upper limits, the darkening-decreasing effect unfavorably decreases.

The density of the crazes is preferably from a number of 25 to 60 per 10 μm$^2$ when the density is measured in the same manner as described above. If the density of the crazes is less than the lower limit, the viewing-angle-enhancing effect decreases. Contrarily, if the density is more than the upper limit, the darkening-decreasing effect unfavorably decreases.

About the thickness of the film, an optimal value thereof is varied in accordance with the density of the crazes; thus, it is advisable to set the thickness appropriately in accordance with the density. Considering handleability and economical efficiency, the film thickness is preferably from 12.5 to 350 μm.

The method for producing the crazed film is not particularly limited, and is, for example, a method of bringing a blade into contact with a film to form a local bent portion having a predetermined bending angle, and pulling the film at a predetermined tensile force and speed. It is preferred to use the crazed film in the state of being bonded to a liquid crystal monitor through a sticky agent or an adhesive agent. Only when the film is set to be put onto the monitor, an image therein may be strained by fine waved dapples of the viewing-angle-enhancing film.

(Lens Film)

In the viewing-angle-enhancing film of the present invention, a lens film may be used. The lens film used in the present invention preferably has a substantially flat valley region between lens regions adjacent to each other. The width of the valley region is preferably from 3 to 20 μm and more preferably from 5 to 15 μm. If the width of the valley region is less than the lower limit, the darkening-decreasing effect unfavorably declines. Contrarily, if the width is more than the upper limit, the viewing-angle-enhancing effect unfavorably declines.

In lens films disclosed in the prior art, their lens regions adjacent to each other are formed to overlap with each other. The lens film used in the technique disclosed in Patent Document 5 described above is also a film in the same form. This lens film in the prior art has a problem of being poor in light straight-transmitting property so as to be lowered in darkening-decreasing effect although the film is excellent in diffusion-transmitting property. According to the present invention, the substantially flat valley region is made between the adjacent lens regions, whereby the film is restrained from being lowered in light diffusion-transmitting property, while the film can be improved in light straight-transmitting property so as to balance the diffusion-transmitting property and the straight-transmitting property with each other, so that the film satisfies the above-mentioned required characteristics.

The shape or the size of the lens regions is not particularly limited. The shape is, for example, the shape of a circular column, an elliptic column, a triangle pole, a square pole, a hexagonal pole, a circular truncated cone, an elliptic truncated cone, a triangle truncated cone, or a square truncated cone. The shape may be a shape having a side having one or more steps, such as a shape obtained by combining two or more of these shapes with each other, or putting the same onto each other. The size of the lens regions is not particularly limited, either. In the case of, for example, a triangle pole called a prism lens film, which is a typical lens film, the height and the width are preferably from 2 to 10 μm, and from 5 to 20 μm, respectively (see FIG. 2).

(Stacking of the Functional Layers Such as Hard Coat Layer etc.)

In the viewing-angle-enhancing film of the present invention, it is preferred to stack at least one functional layer selected from a hard coat layer, an antireflection layer, and an antiglare layer over a surface of the viewing-angle-enhancing film that is to face an observer. These functional layers may each have a single structure, or a single functional layer may simultaneously have plural functions.

The stacking of the hard coat layer makes an improvement of the surface of the viewing-angle-enhancing film in scratch resistance. The stacking of the antireflection layer and/or the antiglare layer produces the following advantage: even when the liquid crystal display device is used in an environment wherein external light is projected thereon, the projection of the external light is decreased so that the perceivability of the image is improved; and even when the device is used in a bright environment, an decrease in the viewing-angle-enhancing effect is not recognized. The antireflection layer and the antiglare layer need only to have, on their front surface, an antireflection effect, and may be, for example, of an antiglare type, an antireflection type, or a type having the two functions. The use of the latter two is preferred.

About the stacking of the functional layer(s), it is allowable to stack the layer(s) directly onto the surface of the viewing-angle-enhancing film, or to stack a film made of a plastic, such as TAC or PET, that has the functional layer(s) over the viewing-angle-enhancing film. The latter is preferred in some cases since the latter can be attained by use of a product circulated widely in the market. In the latter method, wherein the film having the functional layer(s) is stacked, the film is preferably fixed with a sticky agent or adhesive agent. It is however allowable merely to put the two films onto each other, and fix the two films onto each other with a tool.

The sticky agent or adhesive agent is not limited as far as the agent makes it possible to fix the viewing-angle-enhancing film and the functional-layer-having film onto each other. The agent is preferably an agent for optics.

(Protective Film with Viewing-Angle-Enhancing-Function)

According to the present invention, provided is also a protective film with viewing-angle-enhancing-function wherein the above-mentioned viewing-angle-enhancing film, and a self-adhesive layer are stacked over each other.

It is allowable to form the self-adhesive layer directly onto a surface of the viewing-angle-enhancing film, or to form the layer on another substrate film, and then stack this self-adhesive-layer-stacked film and the viewing-angle-enhancing film onto each other. The latter method is particularly preferred since the method is high in versatility and further embodiments selected for the method can be widened. In the latter method, it is preferred to bond the viewing-angle-enhancing film onto the so-called double-sided adhesive film, which is composed of respective adhesive layers at the double sides, to form a self-adhesive layer. About the double-sided adhesive film, it is allowable to render the double sides respective self-adhesive layers, and fix the viewing-angle-enhancing film through the self-adhesive layer of one of the double sides. It is however preferred, for a strong fixation of the viewing-angle-enhancing film or economical efficiency, to use a method of rendering one of the double sides a pressure-sensitive adhesive layer of, for example, an acrylic type, and bonding the viewing-angle-enhancing film onto the pressure-sensitive adhesive layer side.

When the double-sided adhesive film is used to produce the protective film with viewing-angle-enhancing-function, the kind of the double-sided adhesive film, and the production method thereof are not limited. It is preferred to use, for example, a double-sided adhesive film yielded by a method disclosed in JP-A-2009-73937 since its self-adhesive layer is excellent in self adhesiveness, and further cost performances and others are also excellent.

It is also preferred for economical efficiency and others to use a method disclosed in JP-A-2009-299021 or some other, wherein an amorphous polyolefin type resin layer is stacked directly onto the viewing-angle-enhancing film. The method for the stacking is not limited. The method is, for example, co-extrusion, or lamination.

(Self-Adhesive Layer)

The self adhesiveness in the present invention means a property that when a layer having the self adhesiveness is attached onto an adherend surface, the layer can be bonded thereto even when no pressure from the outside is applied thereto.

The self-adhesive layer is not particularly limited as far as the layer can be repeatedly bonded and peeled. The self-adhesive layer is preferably a layer made of a soft polymer since a change in the bonding performance and peeling performance thereof is small even when the bonding and the peeling are repeated, and further the following phenomenon is not easily caused: when the layer is peeled from the display screen surface, a component of the self-adhesive layer is transferred onto the surface so that the display screen is stained.

The soft polymer may be either a non-crosslinked polymer, or a crosslinked polymer. The polymer may be a gel. The kind of the polymer is not limited. Examples thereof include polyolefin type polymer, acrylic polymer, polyester type polymer, polyurethane type polymer, and silicone type polymer. Preferred are polyolefin type polymer, a composition of polyolefin type polymer and a different polymer, and silicone type polymer since the above-mentioned property is better.

The kind of the silicone type polymer and a crosslinking method therefor are not limited, either, and the method is preferably, for example, a method disclosed in JP-A-2009-113420. It is also preferred to use an additive type silicone polymer.

About the self-adhesive layer made of the soft polymer, the surface layer dynamic hardness thereof is preferably from 0.01 to 100 $mN/\mu m^2$ and more preferably from 0.03 to 80 $mN/\mu m^2$, the hardness being estimated by a measuring method described below.

If the surface layer dynamic hardness is less than 0.01 $mN/\mu m^2$, the layer is not easily peeled so that the above-mentioned repairing performance declines. Contrarily, if the hardness is more than 100 $mN/\mu m^2$, the film is insufficient in fixing power.

(Surface Layer Dynamic Hardness)

A SHIMADZU dynamic ultramicro hardness tester, DUH202 model, manufactured by SHIMADZU CORPORATION is used to make a measurement under the following conditions: test mode: mode 3 (soft material test); indenter type: 115; testing load: 1.97 mN; loading rate: 0.0142 mN/second; and retention period: 5 seconds. Any sample is fixed on a slide glass piece through an epoxy adhesive agent to be set on a measuring stand. About the dynamic hardness measured by the present measuring method, various measured values are obtained in accordance with the depth of the measured point from the front surface of the sample. A value measured at a depth of 3 μm from the surface is defined as the surface layer hardness.

About the self-adhesive layer made of the soft polymer, it is preferred to set the average surface roughness (Ra) of the front surface to 0.12 μm or less, more preferably 0.08 μm or less, and most preferably 0.05 μm or less. In this manner, the self-adhesive layer expresses a practical fixing force based on the self adhesiveness of the layer, that is, a surface tack force. If the average surface roughness (Ra) is more than 0.12 μm, the self adhesiveness is not expressed so that fixation based on its self adhesiveness becomes impossible. The average surface roughness (Ra) is a value measured by the following method:

[Average Surface Roughness (Ra)]

A surface roughness meter, SE-200 model, manufactured by Kosaka Laboratory Ltd. is used to make a measurement under the following conditions: longitudinal ratio: 1000; transverse ratio: 20; cutoff: 0.08 mm; measuring length: 8 mm; and measuring rate: 0.1 mm/minute.

(Method for Using Liquid Crystal Display Device and Viewing-Angle-Enhancing Film or Protective Film with Viewing-Angle-Enhancing-Function)

According to the present invention, provided is also a liquid crystal display device formed by setting the above-mentioned viewing-angle-enhancing film or protective film with viewing-angle-enhancing-function at a position nearer to an observer than the position of a liquid crystal layer in the device.

For the liquid crystal display device, all liquid crystals may be used, examples thereof including active matrix driving type, simple matrix driving type or some other type twist nematic, super-twist nematic, ferroelectric liquid crystal, and antiferroelectric liquid crystals. When the liquid crystal display device has a liquid crystal display using a polarizing plate, the viewing-angle-enhancing film of the present invention needs only to be at a position nearer to an observer than the position of its liquid crystal layer. The film may be inside or outside the polarizing plate. It is preferred that the film is outside the polarizing plate since the generation of polarization spots (dapples) due to the viewing-angle-enhancing film is restrained. The method for setting up the viewing-angle-enhancing film of the present invention to the liquid crystal display device is preferably, for example, a method of bonding the film through, for example, an adhesive agent small in reflection loss, onto a liquid crystal layer substrate, a polarizing plate, a retardation plate or some other in the state that the film adheres thereto as closely as possible. However, the film may be merely put thereon and fixed thereto with a tool.

The bonding of the protective film with viewing-angle-enhancing-function to a display screen surface of the liquid crystal display device is attained through the self-adhesive layer of this film. Accordingly, the protective film with viewing-angle-enhancing-function can be removably fixed onto the display screen surface. Moreover, the film expresses a function of protecting the display screen.

EXAMPLES

Hereinafter, the present invention will be specifically described by way of examples. However, the present invention is not limited by the examples. Such examples may be carried out in the state where an appropriate modification or variation is added thereto as far as the modified or varied examples can conform to the spirit of the present invention. Measuring or evaluating methods adopted in the examples are as described below. In the examples, the word "part(s)" means "part(s) by mass" unless otherwise specified, and the word "%" means "% by mass" unless otherwise specified. In the present examples, a film of any comparative example, which does not satisfy the characteristics of the present invention, is also referred to as a viewing-angle-enhancing film for the sake of convenience.

1. Parallel Light Transmittance

A haze meter NDH-2000, manufactured by Nippon Denshoku Industries Co., Ltd. was used to make measurements in accordance with JIS K 7136.

A film of each of the examples was fixed on a sample stand of the meter to render the winding direction of the film a vertical direction and a horizontal direction, respectively. About each of the directions, the measurement was made three times, and the average of the resultant measured values was used. Furthermore, the average of the measured values in the two directions was calculated, and the average is shown. The reason why the measurements were made in both of the vertical direction and the horizontal direction is that the parallel light transmittance obtained when the film winding direction is rendered the vertical direction may be largely different from that obtained when the film winding direction is rendered the horizontal direction.

When both surfaces of the film had a difference in surface roughness, the film was measured in the state of being fixed in such a manner that light was passed in a direction identical to the direction in which light was passed when the viewing angle enhancement of the film was actually evaluated.

2. Diffusivity (B)

A goniophotometer, i.e., an automatically variable type photometer (GP-200, manufactured by Murakami Color Research Laboratory Co., Ltd.) was used to make measurements.

A sample of each of the examples was measured while its light receiving unit was shifted from −90 degrees to +90 degrees in a transmission measurement mode under the following conditions: light ray incident angle: 0° (angle which was perpendicular to a surface of the sample about each of the upper and lower sides, and right and left sides of the sample); light-receiving angle: −90° to 90° (angle on the equator plane); filter used: ND10; light ray bundle contraction: 10.5 mm (VS-1 3.0); light-receiving contraction: 9.1 mm (VS-3 4.0); item "SENSITIVITY": 950; item "HIGH VOLTON": 600; and varied-angle intervals: 0.1 degree. By this measurement, a varied-angle light (intensity) curve was obtained. The degree of the angle between the rising angle of a peak of the curve and the ending angle of the peak was obtained (see FIG. 1). About the rising angle and the ending angle of the peak, the region concerned was observed with a 10-power loupe, and the angles of the tips at which the line of the peak disappeared were defined as the respective angles. Such an operation can make a clear determination possible.

The plane on which the light-receiving unit was shifted was defined as the equator plane.

This measurement was made to fix the film in such a manner that the winding direction of the film was rendered respective directions parallel to and horizontal to the top and bottom direction of the sample stand. A larger value of the resultant angles was defined as the diffusivity (B).

When both surfaces of the film had a difference in surface roughness, the film was measured in the state of being fixed in such a manner that light was passed in a direction identical to the direction in which light was passed when the viewing angle enhancement of the film was actually evaluated.

The direction along which larger one of the resultant diffusivity (B) values was generated was defined as the main diffusivity direction.

In the measurement of any one of the samples, before the measurement of the sample, a light diffusion film manufactured by Kimoto Co., Ltd., LIGHT UP FILM (registered trade name) 100 DX2FILM was fixed on the sample stand to render the winding direction of the film a direction parallel to the top and bottom direction of the sample stand and further render the diffusion layer side of the sample the light-emitting side thereof. Under the same conditions as described above, the angle-variation light intensity was measured. When the height of a peak top of the varied-angle light intensity curve in the measurement was more than 80% of the full scale or less than 70% thereof, the value of a dial of the item "SENSITIVITY" or "HIGH VOLTON" was finely adjusted to set the height value in the range of 70 to 80% of the full scale.

3. Diffusivity (A)

In the same manner as in the case of the diffusivity (B), the goniophotometer (GP-200, manufactured by Murakami Color Research Laboratory Co., Ltd.) was used to make measurements.

A sample of each of the examples was fixed in the main diffusivity direction decided in the diffusivity (B) measurement, and was then measured under the same conditions as in the case of the diffusivity (B) except that the items "SENSITIVITY" and "HIGH VOLTON".

The setting for the items "SENSITIVITY" and "HIGH VOLTON" was adjusted to set the value of the peak top of the varied-angle light intensity curve of the transmitted light into the range of 20 to 80% of the full scale, and then a varied-angle light intensity curve of the transmitted light was obtained in the same way as in the case of the diffusivity (B).

The following was defined as the diffusivity (A): the value of the width of the angle at a ½ height of the height (half value width) of the peak of the resultant varied-angle light intensity curve of the transmitted light (see FIG. 1).

In the case of a sample high in parallel ray transmittance, the peak top of the varied-angle light intensity curve thereof turns into a trade-off state even when the sensitivity for the measurement is lowered, so that a head peak may not make its appearance. In this case, the film is measured under conditions that the item "SENSITIVITY" is 150 and the item "HIGH VOLTON" is 500, and the following is defined as the diffusivity (A): the width of a peak of a 50% height of the full scale.

When the value of the diffusivity (A) was small, a 10-power loupe was used to measure the half value width.

4. Diffusivity Ratio

At −30 degrees and 0 degree at the varied-angle light intensity curve obtained for the measurement of the diffusivity (A), the transmitted light intensities were measured, respectively, and in accordance with the following expression (1), the diffusivity ratio was calculated, and represented in the unit of %:

$$\text{transmitted light intensity at } -30 \text{ degrees/transmitted light intensity at } 0 \text{ degree} \times 100 \quad (1)$$

When the transmitted light intensity at −30 degrees was very low, a 10-power loupe was used to measure the height.

The angle of −30 degrees was an angle nearer to the center of the peak at the rising-side thereof. The peak of most of all the samples was symmetric, and the value at −30 degrees was substantially equal to that at 30 degrees.

When no head peak made its appearance as described above about any one of the samples, the sample was measured under conditions that the item "SENSITIVITY" was 150 and the item "HIGH VOLTON" was 500. The transmitted light intensity at −30 degrees was regarded as that at −30 degrees, and the height of the full scale was regarded as the transmitted light intensity at 0 degree.

5. Anisotropy

The ratio of the diffusivity (B) in the main diffusivity direction to the diffusivity (B') in the direction perpendicular thereto (the diffusivity (B)/the diffusivity (B')), these diffusivities being yielded in the item 2, was defined as the anisotropy.

6. Viewing-Angle-Enhancing Effect

A TN-mode liquid crystal monitor (V173A) manufactured by Acer Co. was horizontally set on a stand, and each of the sample films was put on the front surface of the liquid crystal monitor, or fixed through a sticky agent thereon. A signal generator (type: CM50) manufactured by COSMO Electronics Co., Ltd. was used to display color bars for viewing-angle-determination, and the bars were observed from the front of the monitor, and further observed from right and left angles of about 60 degrees to the monitor, respectively, in a dark room. About a difference in hue and contrast between the results from the two observations, functional evaluation was made. The difference was ranked. In the ranking, the sample was compared with standard samples that were classified into 5 stages, respectively, to make a determination. Ten persons each made the determination. The average thereof is shown. For the intermediate between any two of the ranks, a number "0.5" was used. For example, a sample having a rank between ranks 2 and 3 was classified into rank 2.5.

A blank (having only a panel) was classified into rank 1. As the number of the rank of a sample is higher, the sample is better.

Any sample having rank 3 or more, out of the samples, was determined to be practical.

In the evaluation, each of the samples was set to be put on or bonded to the liquid crystal monitor to make the main diffusion direction of the light diffusion film parallel to the long sides of the liquid crystal monitor. In a case where the sample is set to be put onto the monitor, the film may be curled or raised up in some other form. In this case, four corners thereof are fixed with tapes to evaluate the sample.

7. Darkening

In the same manner as in the case of the viewing-angle-enhancing effect, a white area of each of the samples was observed from substantially the front thereof. A darkening caused at the time was subjected to a functional evaluation, and ranked. In the ranking, the sample was compared with standard samples that were classified into 6 stages, respectively, to make a determination. Two persons each made the determination. The average thereof is shown. For the intermediate between any two of the ranks, a number "0.5" was used. For example, a sample having a rank between ranks 2 and 3 was classified into rank 2.5.

A blank (having only a panel) was classified into rank 6. As the number of the rank of a sample is higher, the sample is better.

The present property can be improved by changing the color temperature of the liquid crystal panel, or some other; thus, any sample having rank 2 or more, was determined to be practical. Rank 3 or more is more preferred.

8. Total Evaluation

Out of the samples, any sample having rank 3 or more in the viewing-angle-enhancing effect evaluation and rank 2 or more in the darkening evaluation was determined to be practical. Any sample about which the total of the numeral values of the individual ranks was 6 or more was determined to be very good for practical use.

Example 1

An extruder, PCM 45, manufactured by Ikegai Corp. was used to melt-blend 50 parts by mass of a cyclic polyolefin type resin (TOPAS™ 6013F-04, manufactured by Topas Advanced Polymers; melt flow rate: 2.0 (at 230° C.)), and 50 parts by mass of a block copolymer resin made from ethylene and octene (INFUSE™ D9100.05, manufactured by Dow Chemical Company; melt flow rate: 2.4 (at 230° C.)) at a resin temperature of 250° C., and extrude the blend through a T die. The mixture was cooled on a cooling roll having a mirror plane to yield a viewing-angle-enhancing film having a thickness of 120 μm. In the cooling, a close adhesion of the film onto the cooling roll was attained by use of a vacuum chamber.

Characteristics of the resultant viewing-angle-enhancing film are shown in Table 1.

The viewing-angle-enhancing film yielded in the present example was very good in viewing angle enhancement, and was further low in darkening degree; thus, the film was high in quality.

Comparative Example 1

Two melt extruders were used. Through the first extruder thereof, 100 parts by mass of a polypropylene resin WF836DG3 (SUMITOMO NOBRENE, manufactured by Sumitomo Chemical Co., Ltd.) were melted to be made into a base layer A. Through the second extruder thereof, 17 parts by mass of the same propylene resin WF836DG3 (SUMITOMO NOBRENE, manufactured by Sumitomo Chemical Co., Ltd.) and 83 parts by mass of a propylene/ethylene copolymer HF3101C (manufactured by Japan Polypropylene Corp.) were melted and mixed with each other to be made into a light diffusion layer B, and then inside a dice the layers were melt-coextruded by a T-die method to be made into the form of A/B. This lamination was then cooled on a casting roll having a temperature of 20° C. to yield a non-drawn sheet. Next, this non-drawn sheet was drawn 4.8 times at a drawing temperature of 120° C. by use of a peripheral velocity difference between rolls of a longitudinally drawing machine, and then a tenter type drawing machine was used to heat the sheet to 165° C. and then draw the sheet 9 times into a transverse direction at a drawing temperature of 155° C. Next, the sheet was thermally fixed at 166° C. to yield a viewing-angle-enhancing film having an A/B structure wherein the A and B layers had thicknesses of 22.2 μm and 2.8 μm, respectively. Just before the film was wound up, the front surface of the base layer A was subjected to corona treatment.

Characteristics of the resultant viewing-angle-enhancing film are shown in Table 1.

The viewing-angle-enhancing film of the present comparative example was slight in darkening, and had high properties; however, the film was poor in viewing-angle-enhancing effect.

Comparative Example 2

As a viewing-angle-enhancing film, use was made of a polycarbonate film, 250 μm in thickness, a single surface of which was embossed (into a satin finish form) to have an average surface roughness Ra of 0.56 μm.

Characteristics of the resultant viewing-angle-enhancing film are shown in Table 1.

About this viewing-angle-enhancing film, all characteristics thereof were evaluated in the state that light rays were radiated into the film from its surface opposite to the embossed surface.

The viewing-angle-enhancing film of the present comparative example was poor in viewing-angle-enhancing effect.

Comparative Example 3

As a viewing-angle-enhancing film, use was made of a polycarbonate film, 380 μm in thickness, a single surface of which was embossed (into a satin finish form) to have an average surface roughness Ra of 1.2 μm.

Characteristics of the resultant viewing-angle-enhancing film are shown in Table 1.

About this viewing-angle-enhancing film, all characteristics thereof were evaluated in the state that light rays were radiated into the film from its surface opposite to the embossed surface.

The viewing-angle-enhancing film of the present comparative example was poor in viewing-angle-enhancing effect.

Comparative Example 4

As a viewing-angle-enhancing film, use was made of a polyester film, 100 μm in thickness, a single surface of which was embossed (into a satin finish form) to have an average surface roughness Ra of 0.97 μm.

Characteristics of the resultant viewing-angle-enhancing film are shown in Table 1.

About this viewing-angle-enhancing film, all characteristics thereof were evaluated in the state that light rays were radiated into the film from its surface opposite to the embossed surface.

The viewing-angle-enhancing film of the present comparative example was poor in viewing-angle-enhancing effect.

Comparative Example 5

An applicator was used to paint, onto a single surface of a highly transparent polyester film (COSMO SHINE A4300, manufactured by Toyobo Co., Ltd.) 250 μm in thickness, a mixture composed of 50 parts by mass of spherical acrylic resin particles having an average particle diameter of 3 μm (TOUGHTIC™ FH-5300, manufactured by Toyobo Co., Ltd.) and 50 parts by mass of a polyurethane resin, and then dry the mixture in such a manner that the region of the mixture would have a thickness of 30 μm after the drying of the region. In this way, a viewing-angle-enhancing film was yielded.

Characteristics of the resultant viewing-angle-enhancing film are shown in Table 1.

About this viewing-angle-enhancing film, all characteristics thereof were evaluated in the state that light rays were radiated into the film from its surface opposite to the coated surface.

The viewing-angle-enhancing film of the present comparative example was good in viewing-angle-enhancing effect; however, the film was considerably darkened to be poor in darkening-decreasing effect.

Example 2

Two melt extruders were used. Through the first extruder thereof, 35 parts by mass of a cyclic polyolefin resin (TOPAS™ 6013S-04, manufactured by Topas Advanced Polymers; melt flow rate: 2.0 (at 230° C.)) and 65 parts by mass of a block copolymer resin made from ethylene and octene (INFUSE™ D9817.15, manufactured by Dow Chemical Company; melt flow rate: 26 (at 230° C.)) were formed into a base layer A. Through the second extruder thereof, the base layer A and a polypropylene type adhesive resin (ADMER™ QF551, manufactured by Mitsui Chemicals, Inc.; melt flow rate: 5.7 (at 190° C.)) were melt-coextruded by a T-die method to render the adhesive layer each surface layer. The workpiece was then cooled on a cooling roll having a mirror plane to yield a viewing-angle-enhancing film having a total thickness of 56 μm. In the cooling, a close adhesion of the film onto the cooling roller was attained by use of a vacuum chamber. The thicknesses of the layers of the structure were 8 μm, 40 μm and 8 μm, respectively.

Characteristics of the resultant viewing-angle-enhancing film are shown in Table 1.

The viewing-angle-enhancing film yielded in the present working example was slightly poorer in viewing-angle-enhancing effect than that yielded in Example 1; however, the present film was improved in darkening-resistance. In the same manner as the viewing-angle-enhancing film yielded in Example 1, the present film was very good in both properties of the viewing-angle-enhancing effect and the darkening-decreasing effect.

Example 3

Two melt extruders were used. Through the first extruder thereof, 60 parts by mass of a cyclic polyolefin resin (TOPAS™ 6013S-04, manufactured by Topas Advanced Polymers; melt flow rate: 2.0 (at 230° C.)) and 40 parts by mass of a block copolymer resin made from ethylene and octene (INFUSE™ D9100.05, manufactured by Dow Chemical Company; melt flow rate: 2.4 (at 230° C.)) were formed into a base layer A. Through the second extruder thereof, the base layer A and a block copolymer resin made from ethylene and octene (INFUSE™ D9817.15, manufactured by Dow Chemical Company; melt flow rate: 26 (at 230° C.)) were melt-coextruded by a T-die method to render the adhesive layer each surface layer. The workpiece was then cooled on a cooling roll having a mirror plane to yield a viewing-angle-enhancing film having a total thickness of 120 μm. In the cooling, a close adhesion of the film onto the cooling roller was attained by use of a vacuum chamber. The thicknesses of the layers of the structure were 10 μm, 100 μm and 10 μm, respectively.

Characteristics of the resultant viewing-angle-enhancing film are shown in Table 2.

In the same manner as the viewing-angle-enhancing film yielded in Example 2, the viewing-angle-enhancing film yielded in the present working example was very good in both properties of the viewing-angle-enhancing effect and the darkening-decreasing effect.

Example 4

A viewing-angle-enhancing film was yielded in the same way as in Example 2 except that the thicknesses of the layers of the structure were changed to 30 μm, 140 μm and 30 μm, respectively, to set the total layer thickness of the film to 200 μm.

Characteristics of the resultant viewing-angle-enhancing film are shown in Table 1.

The viewing-angle-enhancing film yielded in the working example was somewhat more largely darkened than that yielded in Example 1; however, the present film was better in viewing-angle-enhancing effect than the film yielded in Example 1.

Example 5

Inside a monoaxial extruder (L/D; 22) having a diameter of 60 mm, 35 parts by mass of a block copolymer resin made from ethylene and octene (INFUSE™ D9817.15, manufactured by Dow Chemical Company; melt flow rate: 26 (at 230° C.)) were melted and mixed with 65 parts by mass of a melted polypropylene resin (SUMITOMO NOBRENE, manufactured by Sumitomo Chemical Co., Ltd.; FS2011DG3) at a resin temperature of 240° C., and then the mixture was extruded through a T die. The extruded mixture was then cooled on a casting roll having a temperature of 20° C. to yield a non-drawn sheet. Next, this non-drawn sheet was drawn 4.5 times at a drawing temperature of 118° C. by use of a peripheral velocity difference between rolls of a longitudinally drawing machine, and subsequently a single surface thereof was subjected to corona treatment to yield a viewing-angle-enhancing film having a thickness of 200 μm.

Characteristics of the resultant viewing-angle-enhancing film are shown in Table 1.

Equivalently to the viewing-angle-enhancing film yielded in Example 1, that yielded by the present working example had, with a good balance, both properties of the viewing-angle-enhancing effect and the darkening-decreasing effect.

Example 6

Into a monoaxial extruder was supplied a mixture of 95 parts by mass of a substantially lubricant-free polyethylene terephthalate resin (RE553, manufactured by Toyobo Co., Ltd.) from which water was sufficiently removed by drying at 180° C. in a vacuum drier for 3 hours, 5 parts by mass of a polypropylene resin (SUMITOMO NOBRENE, manufactured by Sumitomo Chemical Co., Ltd.; FS2011DG3), and 5 parts by mass of a polar-group-modified hydrogenated polymer (DYNARON™ 4630, manufactured by JSR Corp.), and then the mixture was melted at 280° C., and passed through a filter and a gear pump to remove contaminants and make the extruded amount rate even. Thereafter, the mixture was sent out through a T die into a sheet form onto a cooling drum having a temperature controlled to 25° C. At this time, wire electrodes each having a diameter of 0.1 mm were used to apply static electricity to the sheet to cause the sheet to adhere closely onto the cooling drum. In this way, a non-drawn film was yielded. Next, the film was drawn 5.0 times into the longitudinal direction thereof at a temperature of 103° C. to yield a viewing-angle-enhancing film having a thickness of 45 μm.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

Example 7

Into a monoaxial extruder was supplied a mixture of 95 parts by mass of a substantially lubricant-free polyethylene terephthalate resin (RE553, manufactured by Toyobo Co., Ltd.) from which water was sufficiently removed by drying at 180° C. in a vacuum drier for 3 hours, and 5 parts by mass of a polypropylene resin (CAP350, manufactured by Dainichiseika Color & Chemicals Mfg. Co., Ltd.), and then the mixture was melted at 280° C., and passed through a filter and a gear pump to remove contaminants and make the extruded amount rate even. Thereafter, the mixture was sent out through a T die into a sheet form onto a cooling drum having a temperature controlled to 25° C. At this time, wire electrodes each having a diameter of 0.1 mm were used to apply static electricity to the sheet to cause the sheet to adhere closely onto the cooling drum. In this way, a non-drawn film was yielded. Next, the film was drawn 5.0 times into the longitudinal direction thereof at a temperature of 103° C. to yield a viewing-angle-enhancing film having a thickness of 50 μm.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

Example 8

Two melt extruders were used. Through the first extruder thereof, the following resins were made into a base layer A: 90 parts by mass of a substantially lubricant-free polyethylene terephthalate resin (RE553, manufactured by Toyobo Co., Ltd.) from which water was sufficiently removed by drying at 180° C. in a vacuum drier for 3 hours; and 10 parts by mass of an ethylene/methacrylic acid copolymer resin (NUCREL™ AN4228C, manufactured by Mitsui Chemicals, Inc.; acid content by percentage: 4% by mass; melt flow rate: 4 (at 190° C.)). Through the second extruder, the base layer A and a substantially lubricant-free polyethylene terephthalate resin (RE553, manufactured by Toyobo Co., Ltd.) from which water was sufficiently removed by drying at 180° C. in a vacuum drier for 3 hours were melt-coextruded by a T-die method to render the polyethylene terephthalate resin each surface layer. The workpiece was sent out into a sheet form on a cooling drum having a temperature controlled to 25° C. At this time, wire electrodes each having a diameter of 0.1 mm were used to apply static electricity to the sheet to cause the sheet to adhere closely onto the cooling drum. In this way, a non-drawn film was yielded. Next, the film was drawn 4.0 times into the longitudinal direction thereof at a temperature of 103° C. to yield a viewing-angle-enhancing film having a thickness of 60 μm.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

Example 9

Into a monoaxial extruder was supplied a mixture of 90 parts by mass of a substantially lubricant-free polyethylene terephthalate resin (RE553, manufactured by Toyobo Co., Ltd.) from which water was sufficiently removed by drying at 180° C. in a vacuum drier for 3 hours, and 10 parts by mass of a specific polypropylene type elastomer resin (TAFTHREN™ T3732, manufactured by Sumitomo Chemical Co., Ltd.; melt flow rate: 4 (at 230° C.)), and then the mixture was melted at 280° C., and passed through a filter and a gear pump to remove contaminants and make the extruded amount rate even. Thereafter, the mixture was sent out through a T die into a sheet form onto a cooling drum having a temperature controlled to 25° C. At this time, wire electrodes each having a diameter of 0.1 mm were used to apply static electricity to the sheet to cause the sheet to adhere closely onto the cooling drum. In this way, a non-drawn film was yielded. Next, the film was drawn 4.0 times into the longitudinal direction thereof at a temperature of 103° C. to yield a viewing-angle-enhancing film having a thickness of 66 μm.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

Comparative Example 6

Into a monoaxial extruder was supplied a mixture of 95 parts by mass of a substantially lubricant-free polyethylene terephthalate resin (RE553, manufactured by Toyobo Co., Ltd.) from which water was sufficiently removed by drying at 180° C. in a vacuum drier for 3 hours, 5 parts by mass of a syndiotactic polystyrene resin (XAREC™ 300ZC, manufactured by Idemitsu Kosan Co., Ltd.), and 5 parts by mass of a polar-group-modified hydrogenated polymer (DYNARON™ 4630, manufactured by JSR Corp.), and then the mixture was melted at 280° C., and passed through a filter and a gear pump to remove contaminants and make the extruded amount rate even. Thereafter, the mixture was sent out through a T die into a sheet form onto a cooling drum having a temperature controlled to 25° C. At this time, wire electrodes each having a diameter of 0.1 mm were used to apply static electricity to the sheet to cause the sheet to adhere closely onto the cooling drum. In this way, a non-drawn film was yielded. Next, the film was drawn 5.0 times into the longitudinal direction thereof at a temperature of 103° C. to yield a viewing-angle-enhancing film having a thickness of 50 μm.

Characteristics of the resultant viewing-angle-enhancing film are shown in Table 1.

The viewing-angle-enhancing film yielded in the present comparative example was considerably darkened to be remarkably poor in darkening-decreasing effect.

Example 10

A blade was brought into contact with a monoaxially drawn polyester film, 50 μm in thickness, thereby forming a local bent region to have a predetermined bending angle, and the film was pulled out from a gap between rolls at a predetermined tensile force and velocity to be continuously crazed in the vicinity of the blade. In this way, a viewing-angle-enhancing film was yielded wherein fine crazes were generated inside of the film.

An observation was made with a confocal microscope about a cross section obtained by cutting the viewing-angle-enhancing film in a direction parallel to the craze-oriented direction, so that substantially linear crazes each having a width of about 0.2 to 0.4 μm and a length of 3 to 6 μm were present in a number of about 45 per square having an area of 10 μm$^2$.

The viewing-angle-enhancing effect and the darkening-decreasing effect thereof were evaluated in the state that the viewing-angle-enhancing film was bonded through a double-sided adhesive tape for optics onto the above-mentioned liquid crystal monitor for evaluation. The other optical characteristics were measured while in the state that an adhesive tape was bonded to the film, light was radiated into the film from the adhesive tape side.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

Example 11

Figure 2:
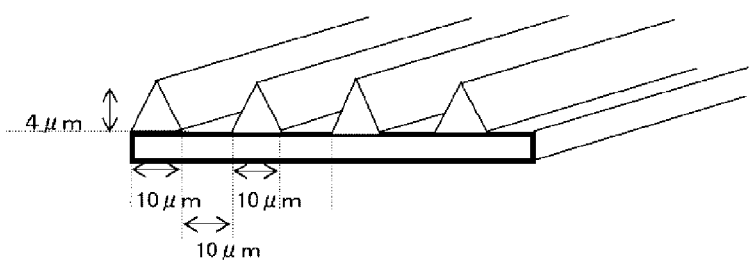
FIG. 2 illustrates a structure of a lens moiety of a lens film of Example 11.

As a viewing-angle-enhancing film, use was made of a lens film having a lens moiety formed on a single surface of a polyester film having a thickness of 100 μm. The moiety had a structure having a substantially flat valley region having a size of about 10 μm between any adjacent two of individual lens regions, as illustrated in FIG. 2.

Characteristics of the resultant viewing-angle-enhancing film are shown in Table 1.

The viewing-angle-enhancing film yielded by the present working example had, with a good balance, both properties of the viewing-angle-enhancing effect and the darkening-decreasing effect.

The viewing-angle-enhancing effect and the darkening-decreasing effect thereof were evaluated in the state that this film was set on the liquid crystal monitor to face the front surface of the lens moiety to the monitor. The other optical characteristics were measured in the state that light was radiated into the film from the lens moiety front surface side.

Comparative Example 7

Figure 3:
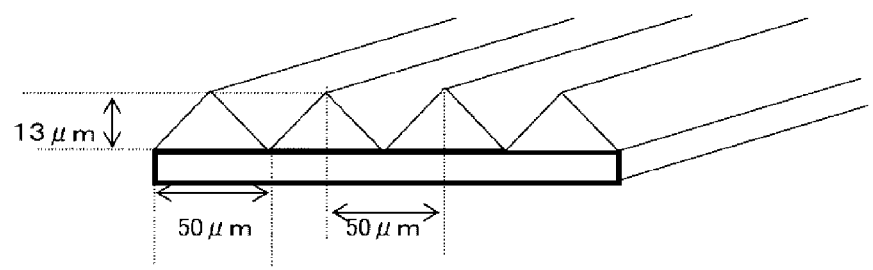
FIG. 3 illustrates a structure of a lens moiety of a lens film of Comparative Example 7.

As a viewing-angle-enhancing film, use was made of a lens film having a lens moiety formed on a single surface of a polyester film having a thickness of 188 μm, this lens moiety being a moiety in such a form that individual lens regions were substantially linked with each other, as illustrated in FIG. 3.

Characteristics of the resultant viewing-angle-enhancing film are shown in Table 1.

The viewing-angle-enhancing film of the present comparative example was good in viewing-angle-enhancing effect; however, the film was considerably darkened to be poor in darkening-decreasing effect.

The viewing-angle-enhancing effect and the darkening-decreasing effect thereof were evaluated in the state that this film was set on the liquid crystal monitor to face the front surface of the lens moiety to the monitor. The other optical characteristics were measured in the state that light was radiated into the film from the lens moiety front surface side.

Example 12 and Example 13

An antireflection type protective film, for display, manufactured by KUREHA ELASTOMER Co., Ltd., to which hard working was applied, was bonded to a surface of the viewing-angle-enhancing film of each of Examples 1 and 2 to yield a functional-layer-stacked viewing-angle-enhancing film.

In the same way as in Examples 1 and 2, the viewing-angle-enhancing performance thereof was evaluated. Results equivalent to those of Examples 1 and 2 were obtained. Furthermore, even when the liquid crystal panel was observed in a bright environment, a decline in the viewing-angle-enhancing effect was not recognized since the antireflection effect was given thereto. Even when the panel was used in a place where external light might be projected thereon, the projection of the external light was restrained so that the panel was improved in image-perceivability. Moreover, the panel was not easily scratched since the hard working was applied to the film.

Example 14 and Example 15

An antiglare type protective film, for display, manufactured by KUREHA ELASTOMER Co., Ltd., to which hard working was applied, was bonded to a surface of the viewing-angle-enhancing film of each of Examples 1 and 2 to yield a functional-layer-stacked viewing-angle-enhancing film.

In the same way as in Examples 1 and 2, the viewing-angle-enhancing performance thereof was evaluated. Results equivalent to those of Examples 1 and 2 were obtained. Furthermore, even when the liquid crystal panel was observed in a bright environment, a decline in the viewing-angle-enhancing effect was not recognized since the antiglare effect was given thereto. Even when the panel was used in a place where external light might be projected thereon, the projection of the external light was restrained so that the panel was improved in image-perceivability. Moreover, the panel was not easily scratched since the hard working was applied to the film.

Example 16-Example 26

About a double-sided adhesive film for optics produced as described in paragraphs 0204 to 0205 of Example 1 in JP-A-2009-73937 (provided that the thickness of its base film was changed to 38 μm), which had a single surface made of a self-adhesive layer and an opposite surface made of an acrylic adhesive layer, its separate film on the acrylic adhesive layer side was peeled, and then the viewing-angle-enhancing film of each of Examples 1 to 11 was bonded to the front surface of the acrylic adhesive layer to yield a protective film with viewing-angle-enhancing-function.

The surface layer dynamic hardness of the front surface of the self-adhesive layer of the double-sided adhesive film for optics was 0.09 mN/μm². The average surface roughness (Ra) was 0.04 μm.

A separate film on the self-adhesive layer side of each of the resultant protective films with viewing-angle-enhancing-function was peeled, and the film was bonded to the display screen surface of the TN mode liquid crystal monitor (V173A) manufactured by Acer Co., which had been used in the above-mentioned method for the viewing-angle-enhancing effect, to render the main diffusion direction of the light diffusion film a direction parallel to the long sides of the liquid crystal monitor. In accordance with the above-mentioned viewing-angle-enhancing effect evaluating method, the viewing-angle-enhancing performance was evaluated. Each of the resultant devices expressed a viewing-angle-enhancing performance equivalent to the results obtained by the viewing-angle-enhancing films of Examples 1 to 11. Thus, the respective devices were excellent in viewing-angle-enhancing performance. The respective protective films were excellent in bonding performance since the films were each bonded to the display screen surface through their self-adhesive layer. Thus, the films were each able to be bonded without nipping the air. For example, even when a small volume of the air was nipped, the air was gone away with time. The self-adhesive layer was easily detached since the layer had a repair performance. The layer was able to be again bonded. Once the layer was detached, no paste remained on the display screen so that the display screen was not stained. Furthermore, the self-adhesive layer had a protecting function for the display screen since the self-adhesive layer had a cushion performance.

Example 27 and Example 28

An antireflection type protective film, for display, manufactured by KUREHA ELASTOMER Co., Ltd., to which hard working was applied, was bonded to a surface of the viewing-angle-enhancing film of the protective film of each of Examples 16 and 17 to yield a functional-layer-stacked protective film.

In the same way as in Examples 16 and 17, the viewing-angle-enhancing performance thereof was evaluated. Results equivalent to those of Examples 16 and 17 were obtained. Furthermore, even when the liquid crystal panel was observed in a bright environment, a decline in the viewing-angle-enhancing effect was not recognized since the antireflection effect was given thereto. Even when the panel was used in a place where external light might be projected thereon, the projection of the external light was restrained so that the panel was improved in image-perceivability. Moreover, the panel was not easily scratched since the hard working was applied to the film.

Example 29 and Example 30

An antiglare type protective film, for display, manufactured by KUREHA ELASTOMER Co., Ltd., to which hard working was applied, was bonded to a surface of the viewing-angle-enhancing film of the protective film of each of Examples 16 and 17 to yield a functional-layer-stacked protective film.

In the same way as in Examples 16 and 17, the viewing-angle-enhancing performance thereof was evaluated. Results equivalent to those of Examples 12 and 13 were obtained. Furthermore, even when the liquid crystal panel was observed in a bright environment, a decline in the viewing-angle-enhancing effect was not recognized since the antiglare effect was given thereto. Even when the panel was used in a place where external light might be projected thereon, the projection of the external light was restrained so that the panel was improved in image-perceivability. Moreover, the panel was not easily scratched since the hard working was applied to the film.

|  | parallel light transmittance (%) | diffusivity (A) (degree) | diffusivity (B) (degree) | diffusivity ratio (%) | anisotropy | viewing-angle-enhancing effect | darkening |
|---|---|---|---|---|---|---|---|
| Example 1 | 28.0 | 3 | 165 | 2.4 | 2.4 | 4.5 | 3 |
| Example 2 | 47.9 | 4 | 170 | 1.1 | 2.8 | 4 | 4 |
| Example 3 | 40.1 | 4 | 170 | 0.46 | 3.6 | 4 | 3.5 |
| Example 4 | 5.4 | 8 | 170 | 11.0 | 1.2 | 5 | 2 |
| Example 5 | 26.5 | 4 | 169 | 0.5 | 2.3 | 3.5 | 3 |
| Example 6 | 13.6 | 3 | 167 | 1.0 | 1.3 | 4.5 | 2.5 |
| Example 7 | 21.2 | 8 | 163 | 1.5 | 3.0 | 4.5 | 3 |
| Example 8 | 17.1 | 2 | 168 | 0.8 | 1.7 | 4 | 3 |
| Example 9 | 10.7 | 19 | 167 | 4.5 | 2.0 | 4 | 2.5 |
| Example 10 | 62.5 | 4 | 156 | 9.0 | 4.6 | 3 | 5 |
| Example 11 | 40.1 | 4 | 159 | 5.2 | 3.1 | 3.5 | 3.5 |
| Comparative Example 1 | 23.1 | 9 | 68 | 0 | 1.0 | 1.5 | 4.5 |
| Comparative Example 2 | 43.9 | 4 | 91 | 0 | 1.0 | 1.5 | 3.5 |
| Comparative Example 3 | 18.6 | 8 | 47 | 0 | 1.0 | 1 | 4.5 |
| Comparative Example 4 | 26.2 | 6 | 97 | 0 | 1.0 | 1.5 | 4.5 |
| Comparative Example 5 | 3.7 | 22 | 170 | 4.9 | 1.0 | 4 | 1.5 |
| Comparative Example 6 | 0.8 | 100 | 180 | 78.8 | 1.0 | 3 | 1 |
| Comparative Example 7 | 2.1 | 62 | 135 | 78.1 | 5.6 | 5 | 1.5 |

INDUSTRIAL APPLICABILITY

The viewing-angle-enhancing film of the present invention has a light distributing pattern having both properties of light straight-transmitting property and light diffusive-transmitting property. Thus, the present invention can provide a liquid crystal display device satisfying, at a high level, antinomic phenomena of an enhancement in viewing angle, and a decrease in the darkening of its images at the time of observing the screen from the front thereof.

The protective film with viewing-angle-enhancing-function of the present invention has the above-mentioned viewing-angle-enhancing function and further has the self-adhesive layer stacked; thus, the film can be removably bonded onto a display screen of a liquid crystal display device. Accordingly, when the film is bonded to a display screen surface of a commercially available liquid crystal display device, the film can improve the liquid crystal display device in viewing angle enhancement, and further give a display-screen-protecting function thereto.

The invention claimed is:

1. A viewing-angle-enhancing film which is set in a liquid crystal display device at a position nearer to an observer than the position of a liquid crystal layer in the device, and simultaneously satisfies the following requirements (1) to (3):
   (1) the film has a parallel ray transmittance of 5 to 90%;
   (2) the film has a diffusivity (A) of 1 to 20 degrees in its main diffusion direction;
   (3) the film has a diffusivity (B) of 140 to 175 degrees in the main diffusion direction; and
   (4) the film has a diffusivity ratio of 0.25 to 15% in the main diffusion direction.

2. The viewing-angle-enhancing film according to claim 1, wherein the ratio of the diffusivity (B) in the main diffusion direction to the diffusivity (B') of the film in the direction perpendicular to the main diffusion direction (the diffusivity (B)/the diffusivity (B')) is from 1.2 to 6.0.

3. The viewing-angle-enhancing film according to claim 1, which is yielded by melt-extruding a mixture of at least two kinds of thermoplastic resins incompatible with each other.

4. The viewing-angle-enhancing film according to claim 1, which consists of a polyester-based crazed film.

5. The viewing-angle-enhancing film according to claim 1, which consists of a lens film having a substantially flat valley region between lens regions adjacent to each other.

6. The viewing-angle-enhancing film according to claim 1, wherein at least one functional layer selected from a hard coat layer, an antireflection layer, and an antiglare layer is stacked over a surface of the viewing-angle-enhancing film that is to face an observer.

7. A protective film with viewing-angle-enhancing-function comprising the viewing-angle-enhancing film of claim 1, and a self-adhesive layer stacked over each other.

8. A protective film with viewing-angle-enhancing-function comprising the viewing-angle-enhancing film of claim 1 and a double-sided adhesive film, wherein one of the sides of the double-sided adhesive film consists of a self-adhesive layer, and the other of the sides of the double-sided adhesive film consists of a pressure-sensitive adhesive layer, and wherein the viewing-angle-enhancing film is stacked on the double-sided adhesive film through the pressure-sensitive adhesive layer.

9. The protective film with viewing-angle-enhancing-function according to claim 7, wherein the self-adhesive layer is made of a soft polymer.

10. A liquid crystal display device, including a liquid crystal layer, and the viewing-angle-enhancing film of claim 1, wherein the film is set at a position nearer to an observer than the position of the liquid crystal layer.

11. A liquid crystal display device, including a display screen, and the protective film with viewing-angle-enhancing-function of claim 7, wherein the film is removably bonded through the self-adhesive layer to a surface of the display screen.

12. The protective film with viewing-angle-enhancing-function according to claim 8, wherein the self-adhesive layer is made of a soft polymer.

13. A liquid crystal display device, including a display screen, and the protective film with viewing-angle-enhancing-function of claim 8, wherein the film is removably bonded through the self-adhesive layer to a surface of the display screen.

14. A protective film with viewing-angle-enhancing-function comprising the viewing-angle-enhancing film of claim 2, and a self-adhesive layer stacked over each other.

15. A protective film with viewing-angle-enhancing-function comprising the viewing-angle-enhancing film of claim 2 and a double-sided adhesive film, wherein one of the sides of the double-sided adhesive film consists of a self-adhesive layer, and the other of the sides of the double-sided adhesive film consists of a pressure-sensitive adhesive layer, and wherein the viewing-angle-enhancing film is stacked on the double-sided adhesive film through the pressure-sensitive adhesive layer.

16. The protective film with viewing-angle-enhancing-function according to claim 15, wherein the self-adhesive layer is made of a soft polymer.

17. A liquid crystal display device, including a display screen, and the protective film with viewing-angle-enhancing-function of claim 15, wherein the film is removably bonded through the self-adhesive layer to a surface of the display screen.

* * * * *